United States Patent [19]

Whittier

[11] Patent Number: 5,078,864
[45] Date of Patent: Jan. 7, 1992

[54] HIGH FLOW RATE REVERSE OSMOSIS WATER FILTRATION SYSTEM FOR HOME USE

[75] Inventor: Scott Whittier, Orem, Utah

[73] Assignee: Nature's Sunshine Products, Inc., Spanish Fork, Utah

[21] Appl. No.: 485,157

[22] Filed: Feb. 23, 1990

[51] Int. Cl.$^5$ .............................................. B01D 61/08
[52] U.S. Cl. .................................. 210/137; 210/238; 210/259; 210/321.84
[58] Field of Search ............ 210/259, 137, 232, 321.84, 210/238

[56] References Cited

U.S. PATENT DOCUMENTS

| | | | |
|---|---|---|---|
| 3,774,763 | 11/1973 | Yall et al. | 210/259 X |
| 3,776,842 | 12/1973 | Grimme | 210/259 X |
| 4,713,175 | 12/1987 | Bray | 210/259 |

Primary Examiner—Frank Spear
Attorney, Agent, or Firm—Hubbard, Thurman, Tucker & Harris

[57] ABSTRACT

A compact, high flow rate reverse osmosis water filtration system suitable for home use has four primary operating components—a carbon sediment pre-filter assembly, a reverse osmosis filter assembly, a granulated activated carbon post-filter assembly, and a flow controller. These four components are operatively interconnected by lengths of flexible tubing provided with finger operable quick disconnect fittings which permit each element to be rapidly disconnected from and reconnected to the balance of the system without the use of tools of any sort. Each of the three filter assemblies is of a throwaway construction comprising a filter material permanently sealed within a housing structure. Filter changeout is thus easily and quickly achieved by the homeowner simply by disconnecting the particular filter assembly and discarding it, housing and all, and then quickly reconnecting a replacement filter assembly in the system. A specially designed combination water supply/rinse water discharge fitting is utilized to operatively connect the system to a sink faucet, and a high purified drinking water production rate is achieved utilizing a rolled, double wrapped filter membrane structure in the reverse osmosis filter assembly.

8 Claims, 3 Drawing Sheets

HIGH FLOW RATE REVERSE OSMOSIS WATER FILTRATION SYSTEM FOR HOME USE

BACKGROUND OF THE INVENTION

The present invention relates generally to water filtration apparatus, and more particularly relates to improvements in reverse osmosis water filtration systems.

Reverse osmosis water filtration systems for home use are typically located under the countertop or sink in the kitchen. Those that are located on the countertop are connected to a kitchen sink faucet and are operative to receive a flow of tap water, remove undesirable chemicals, such as chlorine, from the tap water, and deliver a flow of purified drinking water utilizing a reverse osmosis filter structure and various pre-filter and post-filter apparatus.

Typical reverse osmosis filtration units of this general type have been subject to various well-known problems, limitations and disadvantages. For example, they are often characterized by inordinately slow purified water output flow rates which require a substantial, and often inconvenient lead time between the initiation of water filtration and the accumulation of a useful quantity of cleansed, better tasting drinking water. As an example, many home filtration units presently available are capable of producing only about six to eight gallons of purified drinking water per day, while some commercially available units fall considerably short of that output rate.

Additionally, while many conventional home reverse osmosis water filtration units are designed to permit the homeowner to change out various filter elements of the unit at the end of their useful lives, in practice this is not a particularly easy or convenient task. The difficulty arises primarily through the construction and interconnection of the filter assemblies. Typically, each filter assembly has a cylindrical housing, with screw-on end caps, within which a removable filter structure is removably disposed. The individual filter assemblies are interconnected by flexible hoses with wrench-operable disconnect fittings at their opposite ends.

Thus, to remove and replace the filter structure within a given housing it is necessary to use a wrench (or other tool) to disconnect the housing from the balance of the filtration system, remove one of the housing end caps and remove the filter structure from within the housing. The housing interior, is then cleaned and a replacement filter structure placed therein. The removed threaded housing cap is then screwed back on the housing, and the hose fittings are wrench-tightened back onto the housing. For many homeowners, this periodic filter structure replacement is simply too tedious and inconvenient, and is thus either ignored or an expensive repairman is called to effect the necessary periodic filter element changeout.

The overall supply of tap water to the filtration system is typically effected by connecting an inlet hose to a kitchen sink faucet using a small adapter fitting. A portion of the supply water is ultimately flowed through the reverse osmosis filter element of the filtration system and, after purification, is suitably captured for later consumption. The balance of the supply water flow to the filtration system is used to continuously rinse the reverse osmosis filter element and is separately discharged from the filtration system as waste water. Such waste water discharge is typically accomplished using a flexible discharge hose that is normally draped over the side and laid in the bottom of the sink whose faucet is being used as a supply water source. As will be readily appreciated, the often lengthy presence of the discharge hose in the sink interferes with the use of the sink and presents a potentially unsanitary condition.

In view of the foregoing, it is accordingly an object of the present invention to provide a reverse osmosis water filtration system, suitable for home use, which eliminates or minimizes the above-mentioned and other problems, limitations and disadvantages commonly associated with conventional reverse osmosis water filtration systems of the general type described above.

SUMMARY OF THE INVENTION

Various aspects of the present invention, by themselves and in combinations with one another, may be utilized to provide substantial improvements in a reverse osmosis water filtration system suitable for home use. Set forth below are brief summaries of various features of the present invention. The sole purpose of the following summarization is to provide a general overview of the invention, and is not to be construed as in any manner limiting its nature or scope.

In a preferred, overall embodiment of the various invention aspects, a compact, high capacity reverse osmosis water filtration system is provided which is suitable for home use and, from a maintenance standpoint, is decidedly user-friendly. The system preferably includes four cylindrically configured primary components compactly arranged in a housing not substantially larger than a small toaster—a carbon sediment pre-filter assembly, a reverse osmosis filter assembly, a flow controller, and a granulated activated carbon post-filter assembly.

In use of this preferred, overall embodiment of the present invention, tap water is sequentially flowed through the pre-filter assembly and into the reverse osmosis filter assembly. A portion of the pre-filtered water entering the reverse osmosis filter assembly is flowed across its internal filter membrane structure and then flowed through the post-filter assembly to be captured, as now finally purified drinking water, and stored for later consumption. The balance of the pre-filtered water entering the reverse osmosis filter assembly is used to continuously rinse the filter membrane therein and is continuously discharged through the flow controller as waste water.

According to one aspect of the present invention, a uniquely constructed diverter fitting is removably connectable to a sink faucet and has formed therein separated water supply and rinse water return passages. The water supply passage is adapted to receive a through-flow of tap water, and is communicated with the inlet of the pre-filter assembly by a first flexible hose. The rinse water return passage is communicated with the outlet of the flow controller and is configured to downwardly discharge rinse water, returned from the flow controller, into the sink. In this manner, the previous necessity of laying a rinse water discharge hose in the sink may be advantageously avoided.

According to another aspect of the invention, the three filter assemblies and the flow controller are operatively interconnected by lengths of flexible hose provided with finger operable quick disconnect fittings which permit rapid separation of these four filtration system components, for maintenance by the homeowner, without the use of a wrench or other disconnection tools. In a preferred form thereof, these finger operable quick disconnect fittings are commercially available Luer fittings of the type conventionally used in the medical arts to, for example, connect a syringe to a catheter.

According to a further aspect of the invention the filter means within each of the three filter assemblies are permanently sealed within their associated housing. Thus, when any of the three filter means reaches the end of its useful operating life, its associated housing is simply disconnected from the balance of the filtration system and the entire filter assembly, housing and all, is discarded and quickly replaced with another permanently sealed filter assembly. This permits the homeowner to easily and quickly effect filter means change-out without the previous laborious necessity of unscrewing a housing cap, removing the filter means, cleaning the housing, installing new filter means and then replacing the removed cap.

According to a still further aspect of the invention, a very high purified water production rate is achieved by utilizing a rolled, double leaf reverse osmosis membrane as the filter means within the reverse osmosis filter assembly housing. The use of this filter means construction provides a very high reverse osmosis filter area in a very compact space to thereby greatly accelerate the production rate of purified drinking water from an ordinary inflow rate of tap water from a sink faucet or the like.

DETAILED DESCRIPTION

Figure 1:
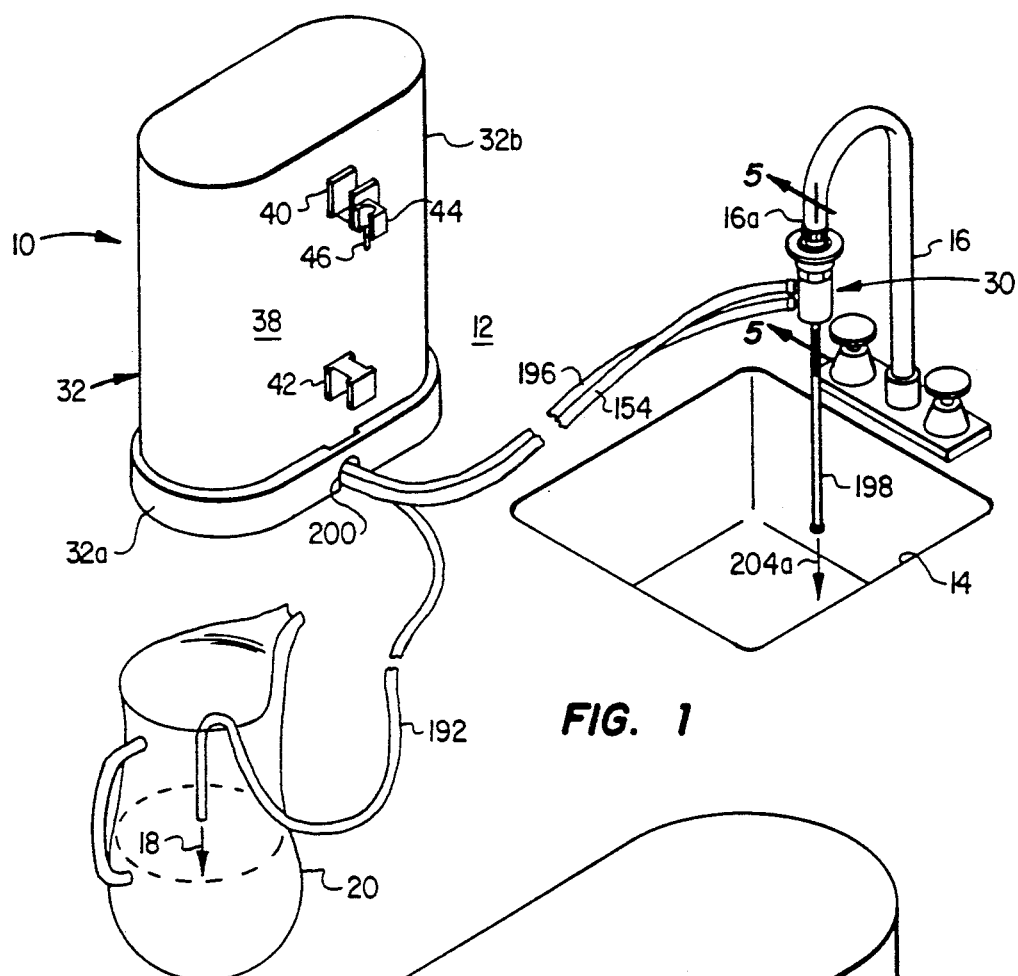
FIG. 1 is a perspective view of a reverse osmosis water filtration system which embodies principles of the present invention and is illustrated operatively connected to a sink faucet.
Figure 3:
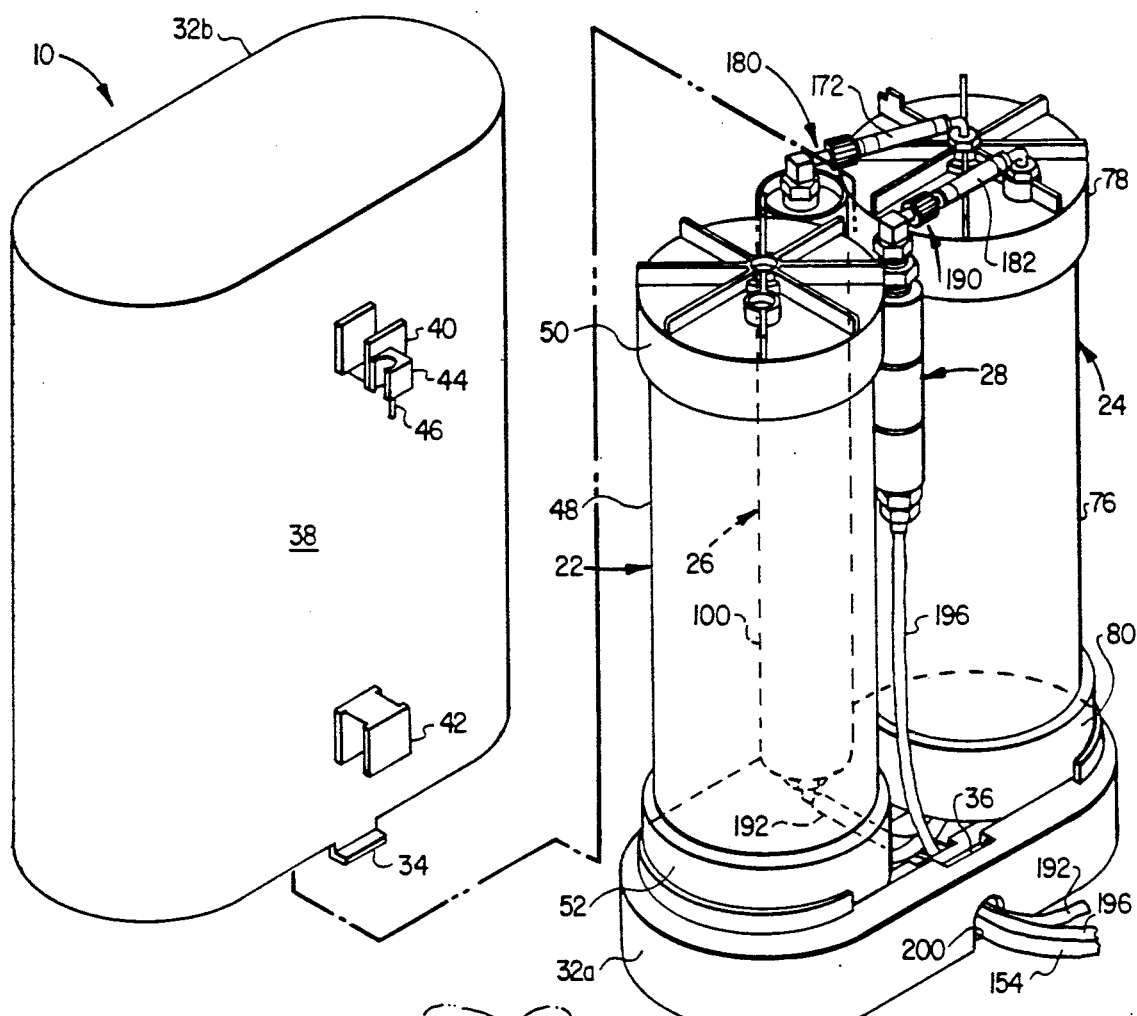
FIG. 3 is a partially exploded perspective view of the filtration system.

Referring initially to FIGS. 1 and 3, the present invention provides a compact, high flow rate reverse osmosis water filtration system 10 which is suitable for home use and which may be placed upon a countertop area 12 adjacent a sink 14 having a water faucet 16 operatively associated therewith. In a manner subsequently described in more detail, the system 10 is connectable to the outlet end $16_a$ of the faucet, and is operative to receive pressurized tap water therefrom and responsively produce from a portion of the tap water a stream of highly purified drinking water 18 which may be collected in a suitable container, such as the illustrated pitcher 20, for later consumption.

As will be seen, compared to conventional home water filtration systems of the same general type and size, the illustrated filtration system 10 has several superior features, including a dramatically increased production rate of purified drinking water 18, substantially easier user maintenance, and a neater and more convenient method of operatively connecting the system 10 to the faucet 16.

The water filtration system 10 is quite simple in construction and has only five primary operating components—a carbon/sediment pre-filter assembly 22, a reverse osmosis filter assembly 24, an activated carbon post-filter assembly 26, a flow controller 28, and a combination tap water/rinse water diverter structure 30 removably connectable to the outlet end $16_a$ of faucet 16. The filtration and flow control components 22, 24, 26, 28 and 30 of the system 10 are compactly arranged in a protective housing 32 about the size of a small toaster.

The housing 32 is formed from a suitable plastic material, and has a horizontally elongated base portion $32_a$ with curved opposite ends, and a vertically elongated hollow cover portion $32_b$ with an open lower end. The opposite side walls of the cover portion $32_b$ are laterally deformable and are provided adjacent their lower edges with outwardly projecting retainer tabs 34, only one of which is visible in the drawings. With the cover portion $32_b$ in its ordinary operating position shown in FIG. 1, the open lower end of the cover portion $32_b$ is received within the complementarily configured base portion $32_a$ and is releasably retained therein by a pair of slots 36 (only one of which is visible in the drawings) which are formed in opposite sides of the base portion 38 and receive the cover portion tabs 34.

To remove the cover portion $32_b$ from the base portion $32_a$, the opposite side walls of the cover portion $32_b$ are simply pushed inwardly to remove the tabs 34 from the slots 36, and the cover portion is lifted off the base portion $32_a$ as illustrated in FIG. 3. To re-install the cover portion, its opposite side walls are again pressed inwardly, the bottom end of the cover portion is slipped into the base portion, and the cover portion side walls are released to cause entry of the tabs 34 into the slots 36.

As best illustrated in FIG. 3, the filtration and flow control components 22, 24, 26 and 28 have generally cylindrical configurations, and are vertically oriented within the protective housing 32, the bottom ends of the filtration assemblies 22 and 24 being supportingly received in the previously mentioned curved end portions of the housing base portion $32_a$. For purposes later described, the rear side wall 38 of the housing cover portion $32_b$ has secured thereto a spaced pair of oppositely opening upper and lower hose support channel members 40 and 42, the upper channel member 40 having an outwardly projecting clip member 44 thereon from which a retaining pin 46 depends.

Figure 4:
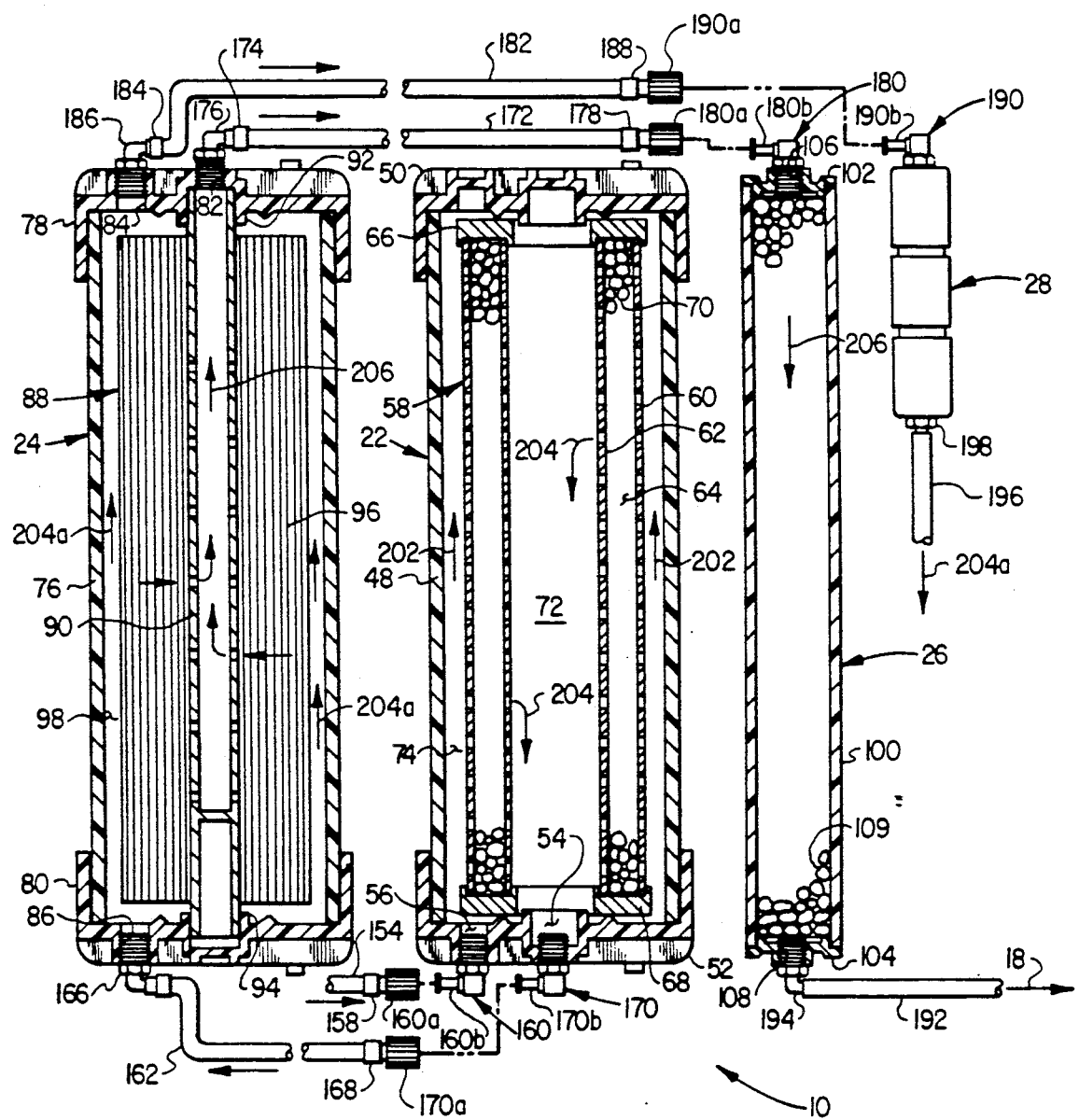
FIG. 4 is a simplified, partially elevational cross-sectional view through filter assembly and flow controller portions of the filtration system.

Turning now to FIGS. 3 and 4, the pre-filter assembly 22 comprises a hollow tubular plastic body portion 48 having upper and lower plastic end caps 50 and 52 permanently cemented in place on the upper and lower ends of the body 48. The lower end cap 52 has formed therethrough a central outlet passage 54 and an inlet passage 56, the inlet passage 56 being radially offset from the outlet passage 54. Coaxially supported and permanently retained within the interior of the body 48 is a tubular filter structure 58 having perforated outer and inner side walls 60 and 62 which define therebetween a vertically extending annular space 64. Passage 64 is closed at its upper and lower ends by filter structure end caps 66 and 68 and is filled with a suitable carbon filtration material 70. The inner side wall 62 defines within the filter structure 58 a hollow cylindrical core portion 72, and the outer side wall 60 defines with the interior side surface of the body 48 an annular flow passage 74.

The reverse osmosis filter assembly 24 has a hollow tubular plastic body portion 76 having upper and lower ends to which upper and lower plastic end caps 78 and 80 are permanently cemented. A central outlet opening 82 is formed through the upper cap 78, and an outlet opening 84 is also formed through the upper cap radially outwardly of the central outlet opening 82. In a similar fashion, an outlet opening 86 is formed through the lower end cap 90 radially outwardly of the central longitudinal axis of the body 76. Coaxially supported and permanently retained within the body 76 is a reverse osmosis filter structure 88 having a hollow tubular core 90 with side wall perforations and upper and lower ends supported in inwardly projecting well portions 92 and 94 of the upper and lower end caps 78 and 80.

To provide the water filtration system 10 with a substantially increased production rate of highly purified drinking water 18, the reverse osmosis filter structure 88 also includes a double leaf reverse osmosis membrane 96 which is wrapped around the filter structure core 90. The double leaf membrane 96 is formed from two elongated sheets of chlorine tolerant, thin film composite material which are superposed, laterally folded, and then rolled around the core 90. As illustrated in FIG. 4, the upper and lower ends of the double leaf membrane structure 96 are inwardly offset from the end caps 78 and 80, and the outer side surface of the cylindrical membrane 96 defines with the interior side surface of the outer plastic body an annular flow space 98.

The post-filter assembly 26 includes a hollow tubular plastic body 100 having a smaller diameter than the diameters of bodies 48 and 76, and having upper and lower ends to which upper and lower end caps 102 and 104 are permanently cemented. An inlet opening 106 is formed centrally through the upper end cap 102, an outlet opening 108 is formed centrally through the lower end cap 104, and the interior of the body 100 is filled with a suitable charcoal filter material 109.

The flow controller 28 is of a conventional construction and has an elongated cylindrical configuration. An inlet opening is formed in the upper end of the flow controller, an outlet opening is formed in the lower end of the flow controller, and the flow controller is adjustable in a conventional manner to selectively vary the rate of water flow therethrough for purposes later described.

Figure 5:
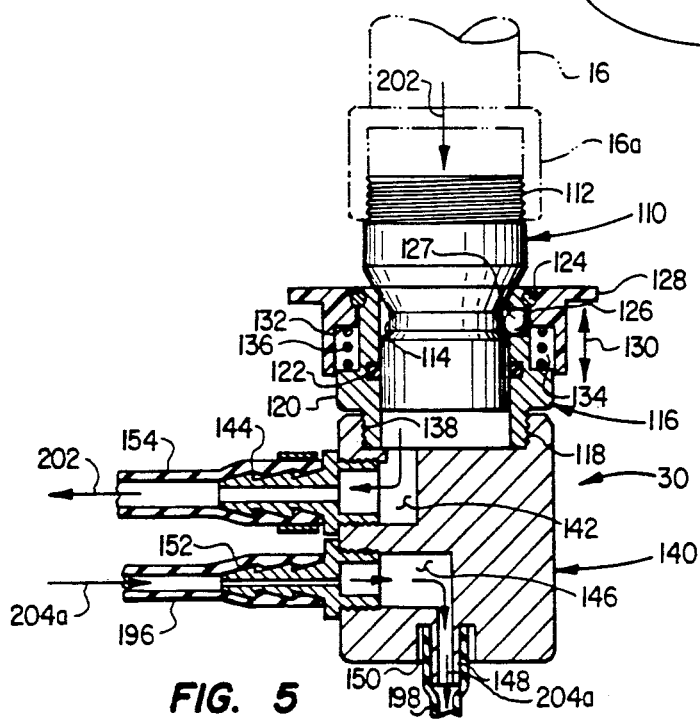
FIG. 5 is an enlarged scale cross-sectional view through a diverter fitting portion of the filtration system taken along line 5—5 of FIG. 1.

Referring now to FIG. 5, the diverter structure 30 includes a hollow, generally cylindrical adapter fitting 110 having an externally threaded upper end portion 112, and an annular exterior side surface depression 114 formed in a lower end portion thereof. The adapter fitting 110 is designed to replace the aerator fitting (not shown) which is normally threaded into the outlet end 16a of the faucet 16. With the aerator fitting removed, the upper end 112 of the adapter fitting is threaded into the outlet end of the faucet as illustrated so that the annular depression 114 of the adapter fitting is spaced downwardly apart from the faucet outlet.

The diverter structure 30 also includes a hollow cylindrical upper body portion 116 with an externally threaded lower end portion 118 and an annular, radially outwardly projecting flange 120 positioned immediately above the threaded end portion 118. Vertically adjacent the upper side of the flange 120, the interior side surface of the upper body portion 116 has formed therein an annular groove which operatively supports an O-ring seal 122. An annular exterior groove formed at the upper end of the body portion 116 supports a second O-ring seal 124. Generally between the seals 122 and 124, three circumferentially spaced openings 126 extend radially through the upper body portion 116, each of the openings 126 supporting a locking ball member 128, only one of the locking balls 128 being visible in FIG. 5.

An annular locking member 128 slidably circumscribes an upper section of the body portion 116 for axial movement relative thereto as indicated by the double-ended arrow 130. The locking member has an annular interior ledge 132 which faces the upper side surface of the flange 120. Locking member 120, as illustrated in FIG. 5, defines an annular cavity 134 around the body portion 116, and a cylindrical compression spring 136 is positioned within the cavity 134 and bears at its opposite ends against the ledge 132 and the upper side surface of the flange 120. The spring 136 upwardly biases the locking member 128 to its position shown in FIG. 5, the O-ring seal member 124 acting as an upper limit stop for the locking member.

To releasable lock the upper body portion 116 on the adapter fitting 110, the locking member 128 is pushed downwardly along the upper body portion 116, against the resilient resistance of the spring element 136, to permit the locking balls 127 to be moved slightly outwardly through their associated openings 126. With the locking member 128 pushed downwardly, the lower end of the adapter fitting is pushed axially into the interior of the upper body portion 116 until the annular depression 114 is axially aligned with the balls 127. The locking member 128 is then released, causing the spring 136 to force the locking member back to its upper limit position in which it forces the balls 127 into the annular depression 114, and holds the balls in this orientation, to prevent removal of the adapter fitting 110 from the upper body portion 116 until the locking member 128 is again moved downwardly along the upper body portion.

The threaded lower end 118 of the upper body portion 116 is screwed into an internally threaded upper end opening 138 formed in a generally cylindrical lower body portion 140 of the diverter structure 30. The opening 138 communicates with the upper end of a first flow passage 142 which extends laterally outwardly through the lower body portion 140. A barbed, tubular outlet fitting 144 is threaded into the flow passage 142 as indicated in FIG. 5.

Spaced downwardly from the first flow passage 142 is a second flow passage 146 which extends radially inwardly through the lower body portion 140 and then turns downwardly therethrough through a tubular outlet stub 148 surrounded by an annular groove 150 extending upwardly through the lower end of the lower body portion 140. An externally barbed tubular inlet fitting 152 is threaded into the radially extending portion of the second flow passage 146 as illustrated.

The five primary operating components 22, 24, 26, 28 and 30 of the water filtration system 10 are operatively interconnected by various lengths of flexible tubing, and associated inlet and outlet fittings, which will now be described with initial reference to FIGS. 1, 4 and 5.

The outlet fitting 144 of the diverter structure 30 (FIG. 5) is connected to the inlet passage 56 of the pre-filter assembly 22 by a flexible tube 154. The inlet end of tube 154 is secured to the diverter structure outlet fitting 144 by a clamp 156, and the outlet end of tube 154 is secured, by a clamp member 158, to the female portion 160a of an ordinary Luer fitting 160 whose complementary male portion 160b is threaded into the inlet passage 56 of the pre-filter assembly 22.

Luer fitting 160 is of a conventional construction and is a quick-disconnect fitting commonly used in medical application to, for example, connect a syringe to a catheter. A fluid-tight connection between the Luer fitting components 160a, 160b may be rapidly effected simply by screwing the fitting portion 160a onto the fitting portion 160b and tightening the fitting portion 160a using only finger pressure. Similarly, the fitting components 160a, 160b can be rapidly separated by twisting the fitting portion 160a off portion 160b, again using only finger pressure.

The central outlet passage 54 of the pre-filter assembly 22 is connected to the bottom inlet opening 86 of the reverse osmosis filter assembly 24 by a flexible tube 162 having an outlet end secured by a clamp 164 to an inlet fitting 166 threaded into the inlet opening 86. The inlet end of tube 162 is secured by a clamp member 168 to the female portion 170a of a Luer fitting 170 having a male portion 170b threaded into the central outlet passage 54 of the pre-filter assembly 22.

The central upper outlet opening 82 of the reverse osmosis filter assembly 24 is connected to the inlet opening 106 of the post-filter assembly 26 by a flexible tube 172. The inlet end of tube 172 is secured by a clamp 174 to an outlet fitting 176 threaded into the outlet opening 82 and the discharge end of the tube 172 is secured by a clamp 178 to the female portion 180 of a Luer fitting 180 having a male portion 180b threaded into the inlet opening 106 of the post-filter assembly 26.

The outlet opening 84 at the upper end of the reverse osmosis filter assembly 24 is connected to the upper inlet end of the flow controller 28 by a flexible tube 182. The inlet end of the tube 182 is secured by a clamp 184 to an outlet fitting 186 threaded into the outlet opening 84, and the outlet end of the tube 182 is secured by a clamp 188 to the female portion 190a of a Luer fitting 190 having a male portion 190b threaded into the upper inlet opening of the flow controller 28.

In a manner subsequently described, the highly purified drinking water 18 is flowed into the container 20 through a length of flexible tubing 192 having an inlet end removably pressed onto an outlet fitting 194 threaded into the outlet opening 108 at the bottom end of the post-filter assembly 26. Additionally, a length of flexible tubing 196 has an inlet end removably pressed onto an outlet fitting 198 threaded into the bottom outlet opening in the flow controller 28, and an outlet end pressed onto the inlet fitting 152 on the diverter structure 30.

As illustrated in FIGS. 1 and 5, the upper end of a short length of flexible tubing 198 is removably pressed onto the downwardly extending outlet stub 148 of the diverter structure 30, with the tube 198 extending downwardly into the sink 14, with the lower end of the tube 198 spaced upwardly from the bottom of the sink. The tubes 154, 196 connected to the diverter structure 30, and the tube 192 discharging purified drinking water 18 into the container 20, extend inwardly into the housing 32 through an opening 200 form in its base portion 32a.

During operation of the reverse osmosis water filtration system 10, with the diverter structure 30 operatively connected to the faucet outlet 16a and the flexible tube 192 extended into the container 20 as illustrated in FIG. 1, cold tap water 202 (FIG. 5) is flowed downwardly through the interior of the diverter structure 30 and outwardly through the first flow passage 142 into the tube 154. The tap water 202 is then flowed through the tube 154 into the annular space 74 of the pre-filter assembly 22 through its bottom inlet passage 56. The cold tap water 202 entering the annular space 74 is then forced inwardly through the perforated side walls 60, 62 of the tubular filter structure 58, and through the carbon filtration material 70 therebetween, into the cylindrical core portion 72 as pre-filtered water 204 (FIG. 4).

The pre-filtered water 204 is forced downwardly through the central outlet passage 54 in the pre-filter assembly, and is flowed through the tube 162 into the annular flow space 98 within the reverse osmosis filter assembly 24. A first portion of the pre-filtered water 204 is flowed upwardly through the annular flow space 98 and is used as rinse water 204a to continuously rinse the double leaf membrane structure 96 before being discharged through the outlet opening 84 and the flexible tube 182 to the flow controller 28. Upon exiting the flow controller 28, the filter rinse water 204a is flowed through the flexible tube 196 to the bottom flow passage 146 of the diverter structure 30 (FIG. 5). Rinse water 204a entering the flow passage 146 is discharged downwardly therefrom through the tube 198 into the sink 114 as illustrated in FIG. 1.

A smaller second portion of the pre-filtered water 204 entering the annular flow space 98 in the reverse osmosis filter assembly 24 (FIG. 4) is forced laterally through the filter membrane structure 96 and into the interior of the hollow filter core portion 90 (through its side wall perforations) in the form of further filtered water 206. This further filtered water 206 is flowed into the inlet opening 106 of the post-filter assembly 26 via the central outlet opening 82 of the filter assembly 24 and the flexible tube 172. Further filtered water 106 entering the interior of the body portion of the post-filter assembly 26 is flowed downwardly through the carbon filter material 109 therein to form the finally filtered water 18 which is continuously discharged into the container 20 FIG. 1) via the flexible tube 192.

In a conventional manner, the water back pressure within the reverse osmosis filter assembly 24, and thus the overall tap water flow rate through the filtration system 10, may be selectively varied by suitable adjusting the flow controller 28. In this manner, the flow rate ratio between the purified drinking water 18 and the continuously discharged filter rinse water 204a may be selectively varied as desired. Preferably, the water flow rate of flow controller 28 is preset at the factory at a selected setting to provide suitable backpressure on membrane structure 96 and is not variable by the user.

The unique reverse osmosis water filtration system 10 just described provides a variety of advantages over conventionally constructed water filtration systems of this general three-stage type. For example, the combination tap water/filter rinse water diverter structure 30, with its separated flow passages 142 and 146, eliminates the previous necessity of extending the filter rinse water discharge tube 196 into the sink 14. Instead, the discharge end of the tube 196 is conveniently supported above the sink 14 and, by appropriately sizing the length of the flexible tube 198, none of the flexible hoses contact the interior surface of the sink 14. As can be seen in FIG. 1, this provides for a very neat and sanitary positioning of the hoses 154 and 196. No tubing lays in the bottom of the sink during operation of the system 10.

Additionally, the use of the reverse osmosis filter membrane structure 96, with its twin sheet, double leaf construction previously described, advantageously permits the water filtration system 10 to produce the highly purified drinking water 18 at a greatly increased output flow rate compared to reverse osmosis water filtration systems of conventional construction.

Specifically, the illustrated water filtration system 10 of the present invention, with an ordinary faucet flow rate of tap water at approximately 60 psi is capable of producing approximately 50–70 gallons per day of highly purified drinking water, a flow rate greatly exceeding the output capacities of most, if not all, conventional systems. This greatly enhanced output capacity thus essentially eliminates the long waiting periods typically required in conventional systems to provide useful quantities of purified drinking water.

In addition to these superior operating features of the system 10, it is also provided with substantially increased user maintenance ease which permits the homeowner to rapidly change out the previously described filter assembly components of the system. This increased maintenance ease is achieved in the present invention by the unique combination therein of the permanently sealed filter assembly construction, and the finger operable quick disconnect means associated with the flexible tubing sections which operatively interconnect the filter system components 22, 24, 26 and 28.

To better understand the maintenance simplicity and speed provided by the filtration system 10 of the present invention, a brief description of the filter replacement procedure in conventional systems will now be given. As an example, to replace the pre-filter portion of a conventional system, it is first necessary to use a wrench or other tool to disconnect the inlet and outlet hoses from the pre-filter assembly. One of the end caps is then unscrewed from the filter assembly body and the spent internal filter structure is removed from the now-opened body. A replacement filter cartridge is inserted into the filter body, after appropriately cleaning the body's interior, and the removed end cap is screwed back into place on the body. The fittings on the temporarily disconnected inlet and outlet hoses are then wrench-tightened back into place on the end cap from which they were initially removed. Similar procedures are conventionally necessary as to the reverse osmosis and post-filter assemblies.

While this conventional filter changeout procedure is, on its face, relatively simple, it has proven to be laborious and inconvenient to many users of conventional reverse osmosis water filtration systems. Often, the result of this inconvenience is that the necessary filter maintenance is simply ignored or is performed, at no small expense, by a service technician.

In the present invention, however, filter changeout may be rapidly and easily effected by the user of the filtration system 10 without the use of any tools whatsoever, and without the necessity of any disassembly of the filter components.

For example, to replace the pre-filter structure 22 (FIG. 4), all that is necessary is to loosen the two Luer fittings 160 and 170, discard the entire pre-filter structure 22 and screw the Luer fitting portions $160_a$, $170_a$ onto their male counterparts $160_b$, $170_b$ on a replacement pre-filter assembly. There is no necessity of replacing the filter structure 58 within the tubular body 48—the entire permanently sealed pre-filter assembly 22, housing and all, is simply thrown away.

In a similar fashion, when the filter membrane structure 96 of the filter assembly 24 reaches the end of its useful life the reverse osmosis portion of the system 10 may be rapidly and easily changed out simply by loosening the three Luer fittings $170_a$, $180_a$ and $190_a$, discarding the filter assembly 24, housing and all, providing a permanently sealed replacement filter assembly 24 (with flexible tubes thereon corresponding to the tubes 162, 172, and 182 having female Luer fitting components installed thereon), and finger tightening the appropriate female Luer fitting components $170_a$, $180_a$, $190_a$ on the replacement filter assembly onto the male Luer fitting components $170_b$, $180_b$ and $190_b$.

In the same manner, the post-filter assembly 26 may be replaced simply by loosening the female Luer fitting portion $180_a$, pulling the tube 192 off the outlet fitting 194, discarding the entire post-filter assembly 26, and rapidly reconnecting a replacement post-filter assembly into the system.

It can readily be seen from the foregoing that the water filtration system 10 of the present invention is one which can be easily maintained in top operating condition by a homeowner without the use of tools or service technicians, and requires only a minimal degree of mechanical ability and manual dexterity on the part of the homeowner.

Figure 2:
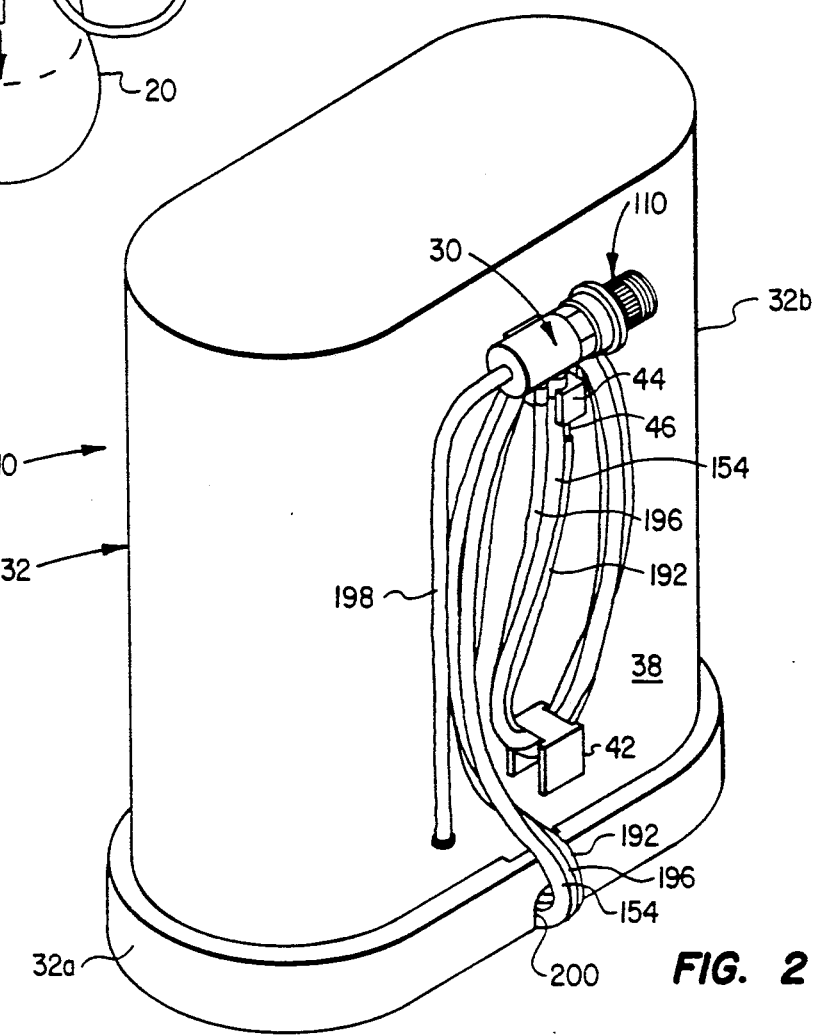
FIG. 2 is a perspective view of the filtration system in its storage orientation.

Between operating periods of the system 10, it may be stored in a convenient location in the compact storage orientation depicted in FIG. 2. As illustrated in FIG. 2, when it is desired to store the system 10, the diverter structure 30 is disconnected from the faucet 16, and the flexible tubes 154, 192 and 196 are wrapped around the support channels 40 and 42, sections of the hoses 154, 196 are snapped into the clip member 44, and the outer end of the tube 192 is removably pressed onto the retaining pin 46.

The foregoing detailed description is to be clearly understood as being given by way of illustration and example only, the spirit and scope of the present invention being limited solely by the apended claims.

What is claimed is:

1. A reverse osmosis water filtration system comprising:
   first filter means, including water filtration means permanently sealed within a first housing, for pre-filtering pressurized water discharged from a source thereof, said first housing having an inlet for receiving pressurized water, and an outlet for discharging pre-filtered water;
   second filter means including reverse osmosis water filtration means permanently sealed within a second housing, for converting a flow of said pre-filtered water from said first filter means into a flow of further filtered water and a flow of reverse osmosis filtration means rinse water, said second housing having an inlet for receiving pre-filtered water, a first outlet for discharging said flow of further filtered water from said second housing, and a second outlet for discharging said flow of reverse osmosis water filtration means rinse water from said second housing;
   third filter means, including water filtration means permanently sealed within a third housing, for converting a flow of said further filtered water from said second housing to a flow of finally filtered drinking water, said third housing having an inlet for receiving said flow of further filtered water, and an outlet for discharging said flow of finally filtered drinking water;

flow control means for receiving a throughflow of said reverse osmosis water filtration means rinse water, said flow control means being operable to maintain a predetermined rate of said throughflow;

conduit means for operatively interconnecting said first, second and third housings and said flow control means in a manner causing pressurized water delivered to said inlet of said first housing to be sequentially and operatively flowed through said first, second and third filter means, and causing reverse osmosis filtration means rinse water discharged from said second housing to be flowed through said flow control means; and finger operable quick disconnect means, associated with said conduit means, for permitting at least one of said first, second and third filter means to be rapidly disconnected from the balance of the water filtration system, discarded, housing and all, and then, operatively replaced with a substantially identical filter means, without the use of tools of any sort.

2. The water filtration system of claim 1 wherein:
said finger operable quick disconnect means include at least one Luer fitting.

3. The water filtration system of claim 1 wherein:
said finger operable quick disconnect means are operative to permit the rapid removal, without tools, of any selected one of said first, second and third filter means from the balance of the water filtration system.

4. The water filtration system of claim 1 wherein:
said reverse osmosis water filtration means include a hollow, generally cylindrical filter structure formed from a laterally folded pair of elongated reverse osmosis filter membrane sheets longitudinally wrapped around a hollow cylindrical interior core portion of said second housing, whereby the finally filtered drinking water output rate of the water filtration system is substantially increased.

5. The water filtration system of claim 4 wherein:
said reverse osmosis filter membrane sheets are formed from a chlorine tolerant, thin film composite material.

6. The water filtration system of claim 1 wherein said flow control means have an outlet for discharging reverse osmosis water filtration means rinse water, and wherein said water filtration system further comprises:
a combination tap water/filter rinse water diverter fitting removably connectable to the outlet end of a sink faucet or the like, said diverter fitting having:

a first interior passage having an inlet for receiving water from the faucet or the like, and an outlet for discharging the received water, and a second interior passage separated from said first interior passage, said second interior passage having an inlet for receiving filter rinse water, and an outlet for discharging the received filter rinse water;

a flexible water supply conduit having a first end connected to said inlet of said first housing, and a second end connected to said outlet of said first interior passage; and a flexible filter rinse water discharge conduit having a first end connected to said outlet of said flow control means, and a second end connected to said inlet of said second interior passage.

7. A reverse osmosis water filtration system comprising:

first filter means for receiving a flow of pressurized water form a source thereof and responsively discharging a flow of pre-filtered water;

second filter means for receiving said flow of pre-filtered water and responsively discharging a flow of filter rinse water and a flow of further-filtered water, said second filter means including a generally tubular reverse osmosis water filter element defined by two superposed, laterally folded elongated sheets of reverse osmosis membrane material longitudinally rolled around a central core;

third filter means for receiving said flow of further-filtered water and responsively discharging a flow of finally filtered drinking water;

flow control means for receiving a throughflow of said filter rinse water and maintaining a predetermined rate of said throughflow; and conduit means for operatively interconnecting said first, second and third filter means and said flow control means in a manner causing pressurized water delivered to said first filter means to be sequentially and operatively flowed through said first, second and third filter means, and causing filter rinse water discharged from said second filter means to be flowed through said flow control means;

wherein said first, second and third filter means are each of a throw-away construction and are removably connected to said conduit means.

8. The reverse osmosis water filtration system of claim 7 wherein:
said first filter means include a water filter material permanently sealed within a first housing,
said reverse osmosis water filter element is permanently sealed within a second housing, and
said third filter means include a water filter material permanently sealed within a third housing.

* * * * *